3,071,593
PREPARATION OF ALKENE SULFIDES
Paul F. Warner, Phillips, Tex., assignor to Phillips
Petroleum Company, a corporation of Delaware
No Drawing. Filed July 27, 1959, Ser. No. 829,518
8 Claims. (Cl. 260—327)

This invention relates to a method of preparing alkene sulfides. Another aspect relates to a method of converting an alkene oxide to the corresponding sulfide at relatively high yields without refrigeration.

By the term "alkene sulfide" as used in this specification and in the claims, I mean to include not only unsubstituted alkene sulfides such as ethylene sulfide, propylene sulfide, isobutylene sulfide, and the like, but also hydrocarbon-substituted alkene sulfides such as styrene oxide, and in general all compounds conforming to the formula

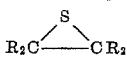

wherein each R is selected from the group consisting of hydrogen, alkyl, aryl, alkaryl, aralkyl and cycloalkyl groups, said R groups having up to 8 carbon atoms individually and up to 12 carbon atoms combined.

Alkene sulfides are having increasing importance in the synthesis of organic sulfur compounds. They can also be employed as insecticides or fungicidal agents as described in U.S. Patent 2,225,573. These compounds can be prepared from the corresponding alkene oxides by reaction with salts of thiocyanic acid in the presence of such solvents as water, alcohol, and ether or mixtures thereof. In such processes refrigeration is necessary for appreciable yields of the desired sulfide; generally, the reaction temperature being about −5 to −10° C.

I have discovered quite unexpectedly that alkene sulfides can be prepared by the reaction between an alkene oxide and a salt of thiocyanic acid without the necessity of refrigeration if the reaction is conducted in a diluent of cycloparaffin. Generally, the cycloparaffin should have from 4 to 12 carbon atoms per molecule and I prefer to use as a diluent for the reaction of my invention a cycloparaffin having from 5 to 8 carbon atoms per molecule.

It is an object of my invention to provide a method of preparing alkene sulfides. Another object is to provide a process by which alkene sulfides can be prepared from the corresponding alkene oxides without the necessity of refrigeration. Still another object of my invention is to improve the yield of alkene sulfide which can be obtained by reacting a salt of thiocyanic acid with an alkene oxide at about room temperature. Other objects, advantages and features of my invention will be apparent to those skilled in the art from the following discussion.

The alkene oxides which can be employed in my invention for the preparation of alkene sulfides are those compounds which have the general formula

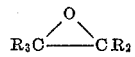

wherein each R is selected from the group consisting of hydrogen, alkyl, aryl, alkaryl, aralkyl and cycloalkyl groups having 1 to 8 carbon atoms, the combined R groups having up to 12 carbon atoms. Examples of suitable compounds are ethylene oxide, propylene oxide, isobutylene oxide, α-amylene oxide, styrene oxide, isopropylethylene oxide, methylethylethylene oxide, 3-phenyl-1,2-propylene oxide, (3-methylphenyl) ethylene oxide, cyclohexylethylene oxide, 1-phenyl-3,4-epoxyhexane, and the like.

The salts of thiocyanic acid which I prefer to use are the salts of the alkali metals or ammonium. I especially prefer ammonium thiocyanate, sodium thiocyanate, and potassium thiocyanate. These compounds can be reacted with ethylene oxide in a cycloparaffin diluent to produce substantial yields of ethylene sulfide and with little or no polymer formation.

It is essential in my invention that the reaction diluent be a cycloparaffin having from 4 to 10 carbon atoms and preferably 5 to 8 carbon atoms per molecule. Examples of suitable cycloparaffins are cyclohexane, cyclobutane, methylcyclopropane, cyclopentane, methylcyclopentane, methylcyclohexane, ethylcyclopentane, 1,1-dimethylcyclopentane, 1,2-dimethylcyclopentane (both cis and trans), 1,3-dimethylcyclopentane (both cis and trans), cyclooctane, ethylcyclohexane, 1,3-dimethylcyclohexane (both cis and trans), 1-isopropyl-4-methylcyclohexane, and the like.

The reaction between the ethylene oxide and the thiocyanate occurs readily in the cycloparaffin diluent at a temperature in the range of about 50 to 150° F. Elevated pressures are not necessary unless the reaction diluent selected requires an elevated pressure to maintain a liquid phase at the temperature chosen to conduct the reaction. Generally, a pressure slightly above atmospheric is used, for example, about 1 to 5 p.s.i.g. The alkene sulfide is preferably separated from the reaction diluent following completion of the reaction by distillation. It is therefore desirable to select a diluent which has a boiling point sufficiently different from that of the desired alkene sulfide to permit a good separation.

To further illustrate the advantages of my invention, the following example is presented which should be interpreted as being typical and not unduly limiting.

EXAMPLE

Ethylene oxide and ammonium thiocyanate were reacted in several runs employing a variety of solvents. In each case the reaction temperature was about room temperature or slightly above. The ethylene sulfide was recovered in those runs with measurable yields by distillation. Ethylene sulfide has a boiling point of 130° F. and can be separated from cyclohexane at atmospheric pressure to yield a product of better than 95 percent purity. The data of these runs are presented in the following table.

Table I

| Run No. | A | | B | | C | | D | | E | | F | | G | | H | | I | |
|---|---|---|---|---|---|---|---|---|---|---|---|---|---|---|---|---|---|---|
| Solvent | Cyclohexane | | Cyclohexane | | Cyclohexane | | Water | | Water | | Water | | Methanol | | n-Heptane | | Soltrol 130[1] | |
| Run conditions: | | | | | | | | | | | | | | | | | | |
| Temp., °F | 88–100 | | 90 | | 85 | | [2] 85–140 | | 88–95 | | 95 | | 85–100 | | 90–108 | | 104 | |
| Pressure, p.s.i.g. | 3 | | 2 | | 1 | | 2.5 | | 0 | | [3] 65 | | 0.0 | | 5 | | 5 | |
| Reaction time, hrs | 2.5 | | 1.2 | | 2 | | 4 | | 3.5 | | 3 | | 3 | | 2 | | 3 | |
| Charge: | G. | Moles | G. | Moles | G. | Moles | G. | Moles | G. | Moles | G. | Moles | G. | Moles | G. | Moles | G. | Moles |
| Ammonium thiocyanate | 152 | 2 | 602 | 7.9 | 568 | 7.48 | 152 | 2 | 152 | 2 | 76 | 1 | 152 | 2 | 76 | 1 | 152 | 2 |
| Ethylene oxide | 156 | 3.1 | 654 | 14.9 | 454 | 10.3 | 260 | 5.9 | 280 | 6 | 41 | 0.9 | 161 | 3.7 | 86 | 1.96 | 100 | 2.3 |
| Solvent | 400 | | 2,780 | | 3,040 | | 150 | | 150 | | 124 | | 150 | | 500 | | 500 | |
| Products: | | | | | | | | | | | | | | | | | | |
| Ethylene sulfide | 60 | 1 | 260 | 4.3 | 296 | 4.95 | None | | [4] None | | <4 | | [5] <20 | | None | | <10 | |
| Polymer | | | None | | | | [6] 36 | | 52 | | | | | | | | | |
| Ethylene oxide | | | 202 | 4.6 | 72 | 1.64 | | | | | | | | | | | | |

[1] Soltrol 130 (Trademark). A mixture of highly branched paraffinic hydrocarbons boiling over the range of about 335° F. to 410° F.
[2] No heat applied. Temperature rise was from exothermal reaction.   [3] Mm. Hg.
[4] Added H₂S to reactor effluent of pH 8. Product consistency of thick gravy and looks like uncoagulated rubber. Recovered 52 g. polymer from it.
[5] Distillation of the reactor effluent yielded 20 ml. of material boiling from 119° F. to 133° F.
[6] Reactor product solidified on cooling; after water washing to remove salts, 36 g. of waxy water insoluble polymer was recovered.

NOTE.—Leaders (------) in figure columns indicate that data was not obtained. Although complete material balances were not made, it is a safe assumption that most of the ethylene oxide unaccounted for went to polymer which was entrained with the ammonium cyanate reactor product.

It can be seen from the above data that the conventional solvents, water and methanol, do not permit satisfactory yields of ethylene sulfide at ambient temperatures whereas the yields when cyclohexane was employed as the diluent were unexpectedly high. It is also noted that acyclic hydrocarbons such as n-heptane and Soltrol 130 did not provide appreciable yields of ethylene sulfide.

As will be evident to those skilled in the art, various modifications of this invention can be made, or followed, in the light of the foregoing disclosure and discussion, without departing from the spirit or scope thereof.

I claim:

1. A process for making alkene sulfides which comprises contacting a compound having the formula

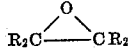

wherein each R is selected from the group consisting of hydrogen, alkyl, aryl, alkaryl, aralkyl and cycloalkyl groups having 1 to 8 carbon atoms, the combined R groups having up to 12 carbon atoms, with a compound selected from the group consisting of ammonium thiocyanate and alkali metal thiocyanates in a reaction diluent of cycloparaffin having 5 to 8 carbon atoms per molecule at a temperature of about 50 to 150° F.

2. The process of claim 1 wherein said reaction diluent is cyclohexane.

3. A process for making alkene sulfides which comprises contacting a compound having the formula

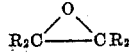

wherein each R is selected from the group consisting of hydrogen, alkyl, aryl, alkaryl, aralkyl and cycloalkyl groups having 1 to 8 carbon atoms, the combined R groups having up to 12 carbon atoms, with a thiocyanate selected from the group consisting of ammonium thiocyanate and alkali metal thiocyanates, in a reaction diluent of from 2 to 10 volumes of cycloparaffin having from 5 to 8 carbon atoms per molecule per volume of reactants at a temperature of about 50 to 150° F., and separating the alkylene sulfide reaction product from the cycloparaffin by distillation.

4. The process of claim 3 wherein said compound is ethylene oxide.

5. The process of claim 3 wherein said compound is propylene oxide.

6. The process of claim 3 wherein said compound is isobutylene oxide.

7. The process of claim 3 wherein said reaction diluent is cyclohexane.

8. A process for making ethylene sulfide which comprises contacting ethylene oxide in a cyclohexane diluent with ammonium thiocyanate at about 50 to 150° F. and separating the ethylene sulfide product from the cyclohexane by distillation.

References Cited in the file of this patent

UNITED STATES PATENTS

| 2,094,837 | Dachlauer | Oct. 5, 1937 |
| 2,094,914 | Dachlauer et al. | Oct. 5, 1937 |
| 2,183,860 | Coltof | Dec. 19, 1939 |